Aug. 5, 1930.　　　G. H. KAEMMERLING　　　1,772,048

PULVERIZER

Filed July 16, 1929

Gustav H. Kaemmerling
INVENTOR

BY
ATTORNEYS.

Patented Aug. 5, 1930

1,772,048

UNITED STATES PATENT OFFICE

GUSTAV H. KAEMMERLING, OF ERIE, PENNSYLVANIA, ASSIGNOR TO ERIE CITY IRON WORKS, OF ERIE, PENNSYLVANIA, A CORPORATION OF PENNSYLVANIA

PULVERIZER

Application filed July 16, 1929. Serial No. 378,750.

Pulverizing devices have heretofore been made in which there is a pulverizing case including pulverizing chambers with rotating beaters, or paddles in the chambers. One of the problems relating to such pulverizers is the control of the fineness of the material pulverized. One of the objects of the present invention is to provide such a control. Features and details of the invention will appear from the specification and claims.

A preferred embodiment of the invention is illustrated in the accompanying drawings as follows:—

Figure 1:
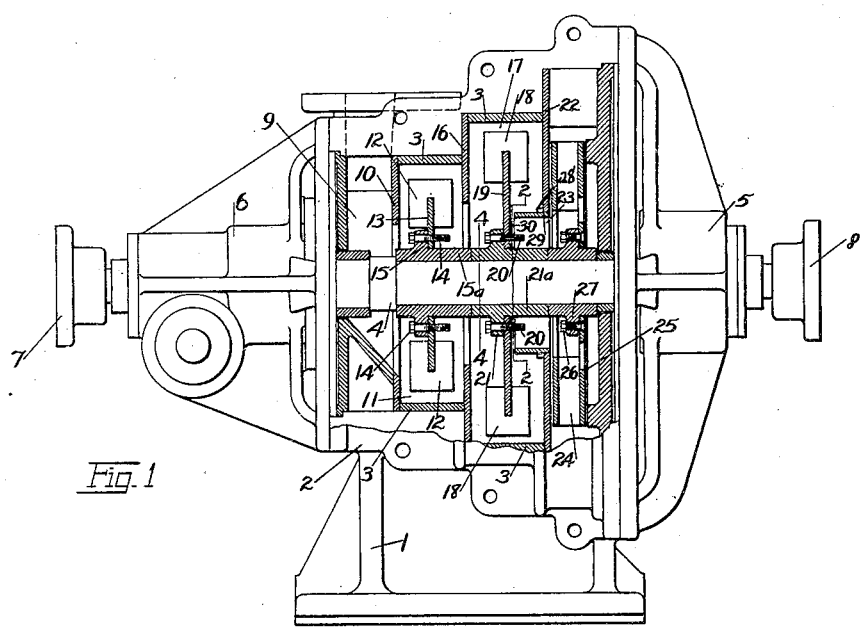

Fig. 1 shows a front elevation, a part being broken away to better show construction.

Figure 2:
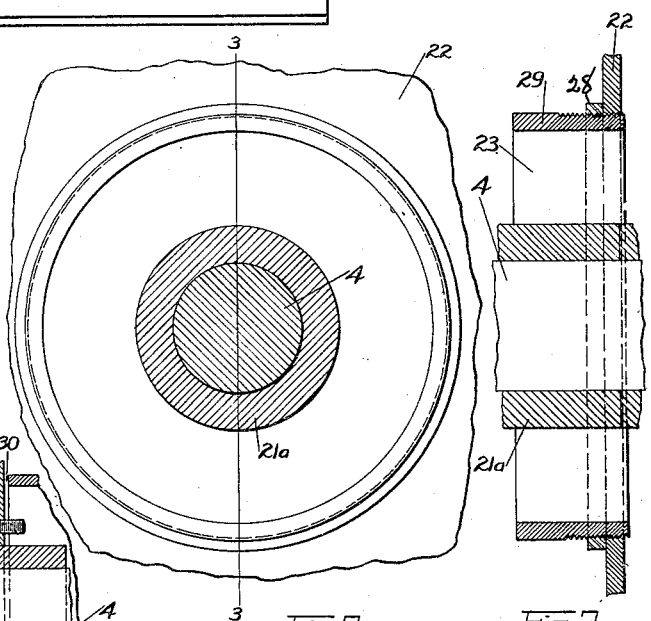

Fig. 2 an enlarged section on the line 2—2 in Fig. 1.

Figure 3:
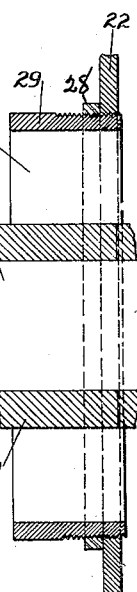

Fig. 3 a section on the line 3—3 in Fig. 2.

Figures 4, 5:
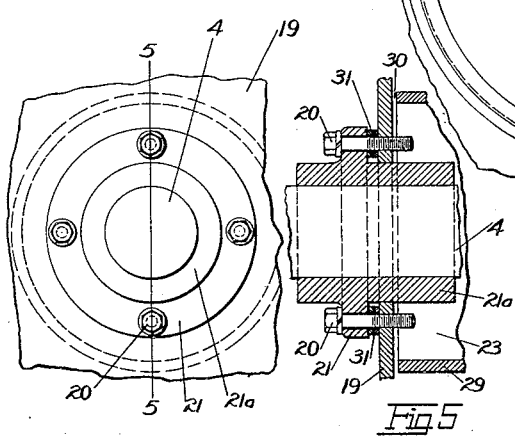

Fig. 4 an enlarged section on the line 4—4 in Fig. 1.

Fig. 5 a section on the line 5—5 in Fig. 4.

1 marks the base of the machine. A pulverizer case 2 is arranged on this base, a part of the pulverizer case being broken away and the interior parts being shown in section. The case is provided with the usual liners 3. A shaft 4 extends axially through the case. It is journaled in bearings 5 and 6 at the ends of the case and is provided with coupling elements 7 and 8 at both ends, either of which may be used to drive the shaft, the other coupling being used to continue as a driving means for a second pulverizer, if desired. The case is provided with an inlet chute 9 which leads through a diaphragm 10 of the initial pulverizing chamber 11. Paddles 12 are arranged in this chamber. They are mounted on a disc 13 and secured by bolts 14 on a flange 15 of the hub 15ª. A diaphragm 16 separates the chamber 17 from the chamber 11. Paddles 18 are arranged in the chamber 17. These are mounted on a disc 19 and the disc is secured by bolts 20 on a flange 21, the flange extending from a hub 21ª. A diaphragm 22 forms the outer wall of the chamber 17 and a discharge opening 23 arranged around the shaft leads from the chamber 17. A fan 24 is arranged at the discharge and receives the material from the chamber 17 and ejects it in the usual manner. The fan is carried by a disc 25 and secured by bolts 26 on a hub 27. The diaphragm 22 is screw-threaded around the opening 23 and a tube 29 is screwed into these screw threads. A locking ring 28 may be used to lock the sleeve in adjustment. The inner end of this tube is adjacent to the disc 19 and forms, in relation to this disc, a discharge restriction 30. This restriction, as it will be noted, may be readily adjusted and made greater or less by screwing the tube in or out of the opening. Another form of adjustment of this restriction may be provided by means of shims 31 between the flange 21 and the disc 19 but this adjustment throws the paddles slightly out of center and if carried to the extreme is objectionable.

By varying the restriction, and particularly with the restriction located, as indicated, the degree of fineness of the material may be controlled within very close limits.

What I claim as new is:—

1. In a pulverizer, the combination of an annular pulverizing chamber having an inlet for material and an outlet adjacent to the center of the chamber; a shaft extending axially through the chamber and carrying pulverizing paddles; means driving gaseous fluid through the pulverizer; and an outlet tube extending into the chamber from the outlet forming a discharge restriction at its inner end.

2. In a pulverizer, the combination of an annular pulverizing chamber having an inlet for material and an outlet adjacent to the center of the chamber; a shaft extending axially through the chamber and carrying a disc and pulverizing paddles; means driving gaseous fluid through the pulverizer; and an outlet tube extending into the chamber from the outlet forming a discharge restriction at its inner end between the tube and disc.

3. In a pulverizer, the combination of an annular pulverizing chamber having an inlet for material and an outlet adjacent to the center of the chamber; a shaft extending axially through the chamber and carrying pulverizing paddles; means driving gaseous fluid through the pulverizer; an outlet tube extending into the chamber from the outlet forming a discharge restriction at its inner end; and means varying the restriction.

4. In a pulverizer, the combination of an annular pulverizing chamber having an inlet for material and an outlet adjacent to the center of the chamber; a shaft extending axially through the chamber and carrying pulverizing paddles; means driving gaseous fluid through the pulverizer; an outlet tube extending into the chamber from the outlet forming a discharge restriction at its inner end; and means varying the restriction comprising means adjusting the tube endwise.

5. In a pulverizer, the combination of an annular pulverizing chamber having an inlet for material and an outlet adjacent to the center of the chamber; a shaft extending axially through the chamber and carrying a disc and pulverizing paddles; means driving gaseous fluid through the pulverizer; an outlet tube extending into the chamber from the outlet forming a discharge restriction at its inner end between the tube and disc; and means varying the restriction comprising means adjusting the tube endwise with relation to the disc.

6. In a pulverizer, the combination of an annular pulverizing chamber having an inlet for material and an outlet adjacent to the center of the chamber; a shaft extending axially through the chamber and carrying a disc and pulverizing paddles; means driving gaseous fluid through the pulverizer; an outlet tube extending into the chamber from the outlet forming a discharge restriction at its inner end between the tube and disc; and means varying the restriction comprising means adjusting the disc toward and from the tube.

7. In a pulverizer, the combination of an annular pulverizing chamber having an inlet for material and an outlet adjacent to the center of the chamber; a shaft extending axially through the chamber and carrying a disc and pulverizing paddles; means driving gaseous fluid through the pulverizer; an outlet tube extending into the chamber from the outlet forming a discharge restriction at its inner end between the tube and disc; and means varying the restriction comprising means adjusting the tube endwise and means adjusting the disc toward and from the tube.

In testimony whereof I have hereunto set my hand.

GUSTAV H. KAEMMERLING.